Oct. 10, 1939.  F. G. RAU  2,175,638

LUBRICANT DEMONSTRATOR

Filed April 20, 1938

INVENTOR.
Frederick G. Rau
BY J. Wesley Everett
ATTORNEY.

Patented Oct. 10, 1939

2,175,638

UNITED STATES PATENT OFFICE 2,175,638

LUBRICANT DEMONSTRATOR

Frederick G. Rau, Baltimore, Md.

Application April 20, 1938, Serial No. 203,216

3 Claims. (Cl. 35—50)

The present invention relates to a device for demonstrating lubricants and is particularly adapted to illustrate the comparison between lubricants of different viscosity or density.

It is a general practice for operators of machinery and particularly motor vehicles, tractors, and the like, to use a type of lubricant best suited to various weather temperatures. That is, a comparatively lighter lubricant is used in cold weather, while a heavier lubricant is used in warm weather.

The reasons for this are well known. Lubricants are very materially affected by changes in temperature. Therefore a cold weather lubricant will lose its viscousness during warmer weather and becomes too thin to adhere to the gear teeth in sufficient quantity to give proper lubrication, while a warm weather lubricant in cold weather will become gummy, or semi-hard. In this state the lubricant will not be sufficiently soft to run between the teeth and the gears again do not receive the proper amount of lubrication. It is for these reasons that to preserve the life and smooth running of the gear members, it is necessary to have the proper lubrication under both cold and warm temperatures.

Many operators of machinery are only casually aware of what actually takes place in the gear housings and it is the primary object of this invention to provide a simple and economical apparatus with which a practical comparative demonstration may be made between several types of lubricants in order that those interested or whose duty it is to see that the machinery is properly lubricated may have the opportunity to observe and operate the demonstrating device for themselves.

Another object of the invention is the provision of separate containers for the different types of lubricants including a separate operated gear assembly in each of the containers.

Still another object of the invention is to provide a gear assembly which will illustrate the well known differential gears of motor vehicles where the large beveled gear picks up the lubricant for lubricating the small pinion gear.

A still further object of the invention is to provide the apparatus with novel means for supporting a card carrying advertising matter and information concerning the different types of oil in the several containers.

With the above and other novel objects in view as will hereinafter be apparent the several novel features of the invention in its preferred form will be more fully described in the accompanying specifications taken in connection with the drawing, which form a part of this application and in which.

Figure 1:
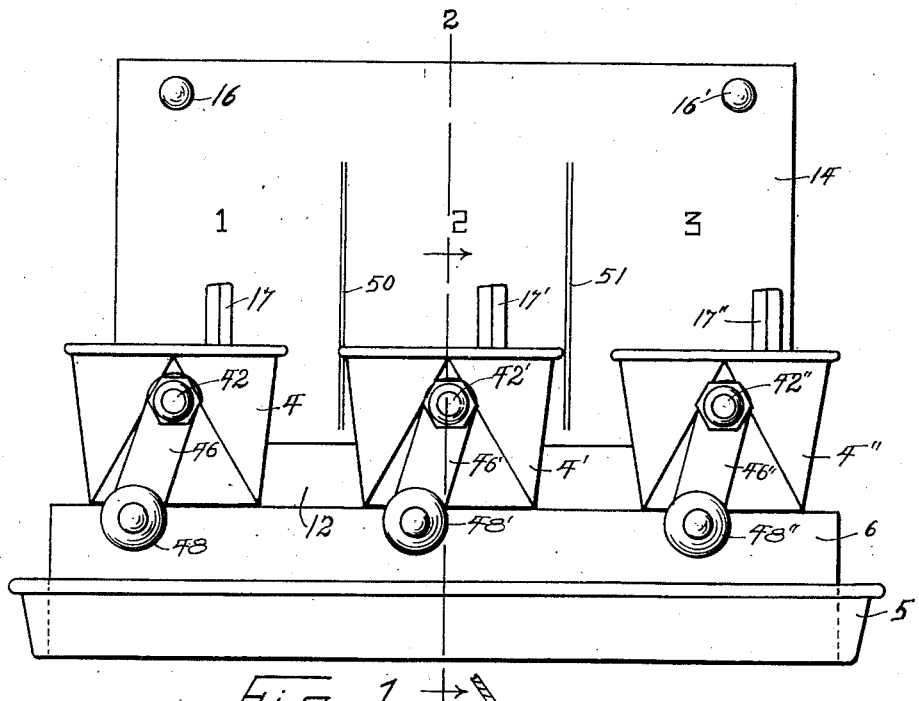
Fig. 1 is a front view of the lubricating demonstrating device.
Figure 3:
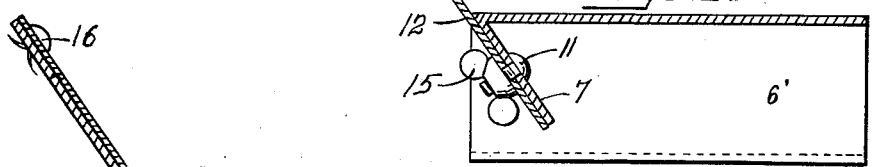

Fig. 3 is a sectional view on the line 2—2 of Fig. 1 of a modified form of support 6, showing the manner in which the member 12 is secured thereto.

Referring now more specifically to the drawing, the apparatus is provided with a base member 5 in the form of a pan for collecting any drippings of the lubricant that may come from the containers 4. Positioned and secured within the pan 5 is a supporting member 6 for supporting the containers 4. This member is preferably made of wood as shown, but may be made of any other suitable material, such as rubber, "Bakelite", metal, etc. If the support is made of wood or similar materials, the pan 2 and the containers 4 may very easily and conveniently be secured to the support by stapling as shown by the dotted lines at 8 and 8'.

The supporting member 6 is preferably provided with an angular slot 10, into which a member 12 is receivable and upon which a card 14 bearing advertising and information concerning the lubricants may be attached by suitable rivets 16 and 16'. These rivets extend through appropriate holes in the supporting member 12 and are of the type that can be easily removed.

This arrangement allows for easy and quick changing of the card, which is necessary, when the type of lubricant is changed in the containers. Usually the card will contain information for winter lubricant on one side and summer lubricant on the opposite side.

Figure 2:
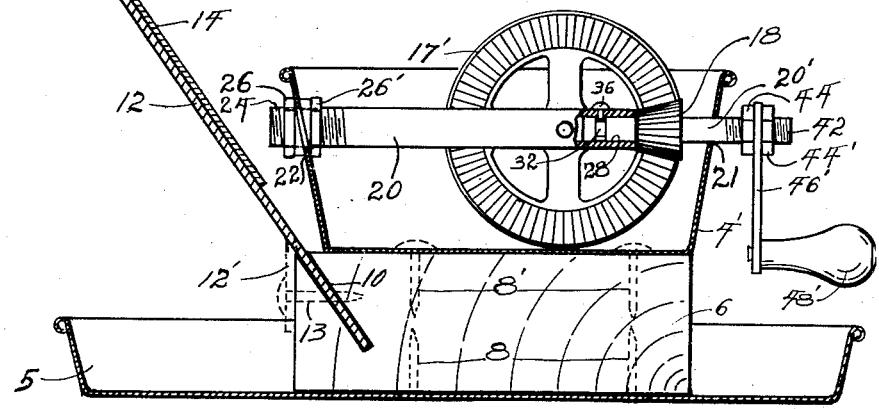
Fig. 2 is a sectional view on the line 2—2 of Fig. 1.

The member 12 may be attached to the container support 6 by forming the lower end of the member 12 to extend along the vertical rear edge of the support as shown by the dotted lines 12' in Fig. 2 and secured thereto by suitable staples 13.

It may be more desirable to print the instructions and advertising directly upon the face of the member 12 and eliminate the card altogether. With this arrangement one set of instructions would be placed on one side while another set for a different type of oil would be placed on the other side. When it becomes necessary to change the sign, it is only necessary to lift the member 12 out of the slot 10 and reverse it. This, however, would not be practical when the member 12 is permanently secured to the support 6.

The support member 6 may be constructed of metal, such as a stamping as shown in Fig. 3 and designated as 6'. The central back portion 7 may be extended out beyond the normal width of the support and bent under to form an acute angle with the upper surface for supporting the member 12. The portion 7 is provided with bolts 11 and wing nuts 15, and other convenient means for holding the member 12 in position.

Each of the containers 4 is provided with a beveled gear 17 and a pinion gear 18. These gears are supported upon members 20 and 20', extending horizontally of the container and supported within the holes 21 and 22 adjacent the top thereof. The hole 22 is adapted to accommodate the stationary shaft 20 and the hole 21 being adapted to accommodate the rotatable shaft member 20'. The end portion of the shaft member 20 is provided with a threaded portion 24 and is locked within the hole 22 of the container by the nuts 26 and 26'. The opposite end of the shaft member 20 is provided with a bearing 28 in which a portion of the shaft 20' is rotatable. The innermost end of the shaft 20' has a groove 32 extending around the shaft into which a pin 36 extends. The pin 36 is secured in the bearing 28 and is adapted to maintain the two shaft members 20 and 20' in a predetermined relationship to each other, and at the same time permitting the members to be rotated relative to each other. The pinion 18 is securely fastened to the shaft 20 and is so positioned as to mesh with the beveled gear 16, when the two shaft members are assembled. The outer end of the shaft 20' is threaded as shown by the numerals 42 upon which the nuts 44 and 44' are threadedly received. The nuts are adapted to lock to the shaft member 20' a bar member 46, which is provided with a handle member 48 adjacent the outer end thereof by which the shaft 20' may be rotated.

Although the operating means for the shaft 20' is specifically shown to be manually operated, it is to be understood that the device may be operated by any other conventional means, such as an electrical motor.

The advertising and information card is positioned at the rear of the containers in order that it may be more conveniently read while the device is being operated. Opposite each of the containers 4, 4', and 4'', are the numerals 1, 2, and 3 respectively for numbering the spaces opposite the containers set apart by the dividing lines 50 and 51. These spaces are primarily for the purpose of describing the type of oil which is in that particular container while the upper portion of the card may be used for advertising matter.

For example, the containers may be prepared to demonstrate the advisability of changing from a summer lubricant to a winter lubricant, which would be at the beginning of cold weather. The summer lubricant being naturally of a heavier grade would be placed in the first container 4. A still heavier grade may be placed in the second container 4' to show the effect of extreme cold weather. In the third container 4'' the proper grade is placed.

The customers would naturally read the signs above each container informing them of the type of lubricant therein and at the same time they would operate the various gears submerged in the lubricants, which would illustrate the action of the different lubricants upon the gears.

Using the types of lubricants stipulated above, the lubricant in container 4 would be gummy and not sufficiently liquid to run between the gear teeth. The heavier type shown in container 4' would be "channelled" by the gears and cause the gears to receive practically no grease. Gears operating under these conditions are inefficient and subject to considerable wear. The lubricant used in the third container 4'' would be of the proper type and would show the customer a complete and proper lubrication.

As the warm season appears and a heavier bodied lubricant becomes desirable, the demonstrator is used in a similar manner to show that a cold weather lubricant becomes too thin by the effect of the rising temperature, and when thin only a small quantity of the lubricant will adhere to the gear teeth, which will not be sufficient for proper lubrication under ordinary circumstances.

The changes on the card are naturally made to conform with the particular lubricants demonstrated.

While the invention has been illustrated and described in a particular form, it is not intended that it be limited to this particular disclosure and description of use, as the scope of the invention is best defined in the following claims.

I claim:

1. In a device for demonstrating lubricants comprising a base, one or more containers rigidly secured to the upper surface of said base for receiving a small quantity of said lubricant, a pair of intermeshing gears in any of said containers supported upon an arm secured adjacent the top of any of said containers, one of said gears being substantially larger than the other and extending downwardly within close proximity of the bottom of any of the said containers, said gears adapted to be intermeshed immediately above the level of the lubricants within any of the said containers and means for operating said gears, whereby the operation of the gears in the right direction causes the lubricant to be drawn up into the intermeshing gears according to its viscosity.

2. In a device for demonstrating lubricants comprising a base, a container rigidly secured to the upper surface of said base for receiving a small quantity of said lubricant, a pair of intermeshing gears in said container supported upon an arm secured adjacent the top of said container, one of said gears being substantially larger than the other and extending downwardly in close proximity of the bottom of said container, said gears adapted to be intermeshed immediately above the level of the said lubricant within the container and means for operating said gears, whereby the operation of the gears in the right direction causes the lubricant to be drawn up into the intermeshing gears according to its viscosity.

3. In a device for demonstrating lubricants comprising a base, a container rigidly secured to the upper surface thereof for receiving a small quantity of lubricant, a pair of intermeshing gears in said container, an arm for supporting both said gears adjacent the upper portion of the said container, one of said gears being substantially larger than the other and extending downwardly within the container within close proximity of the bottom thereof, means for operating the smaller gear, said larger gear adapted to have its lower section immersed within the lubricant and operatable by the said smaller gear immediately above the level of the lubricant in the container, said larger gear adapted to draw up the lubricant into the intermeshing gears when operated in the right direction, thereby providing inspection of the lubricant carried by said larger gear as it passes between the two intermeshing gears.

FREDERICK G. RAU.